G. N. SIMPSON.
CYLINDER CONSTRUCTION.
APPLICATION FILED MAY 7, 1921.
1,402,452.
Patented Jan. 3, 1922.
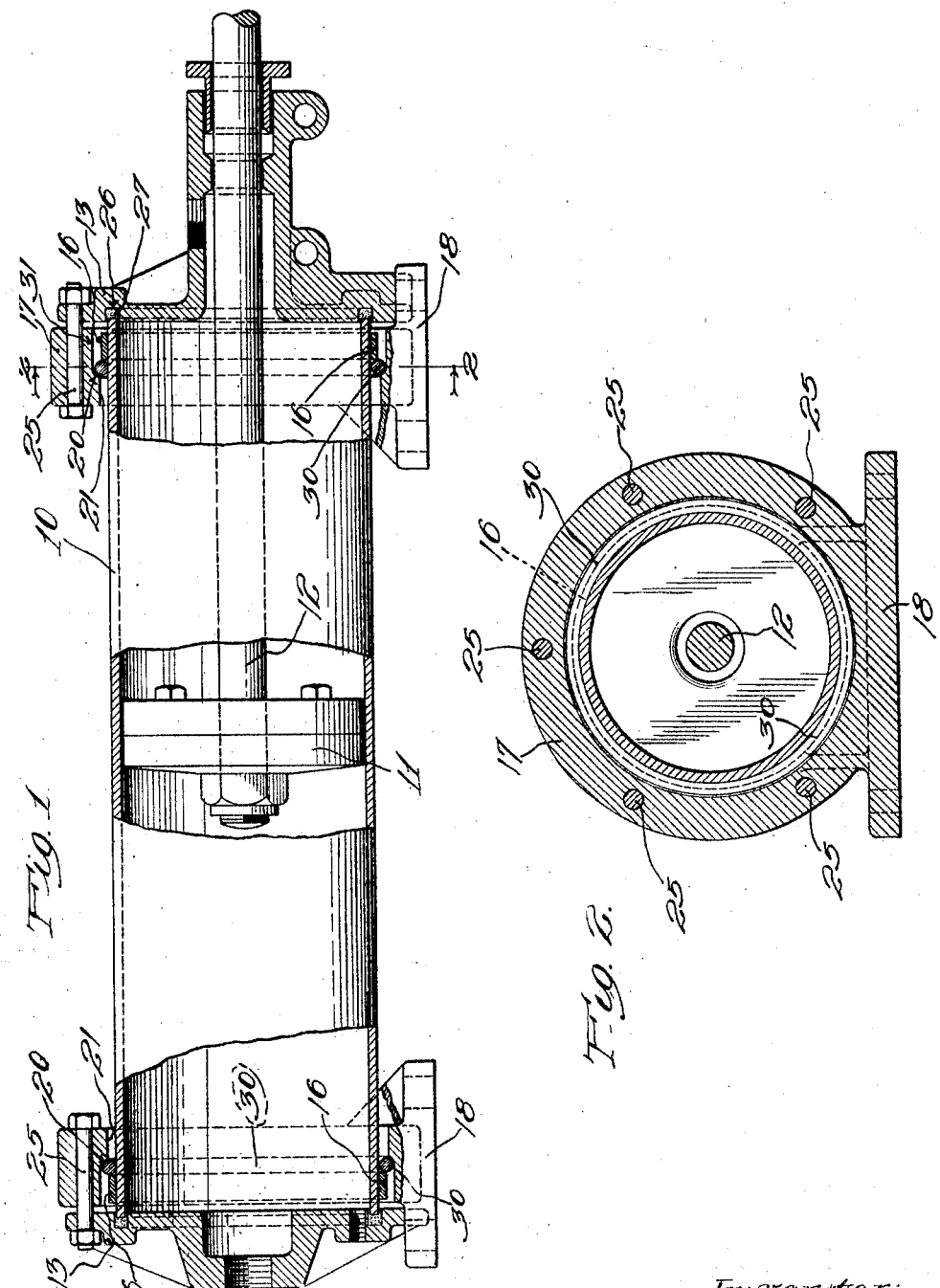

UNITED STATES PATENT OFFICE.

GEORGE N. SIMPSON, OF CHICAGO, ILLINOIS.

CYLINDER CONSTRUCTION.

1,402,452.   Specification of Letters Patent.   Patented Jan. 3, 1922.

Application filed May 7, 1921. Serial No. 467,720.

*To all whom it may concern:*

Be it known that I, GEORGE N. SIMPSON, a citizen of the United States, residing at Chicago, in the county of Cook and State of Illinois, have invented a new and useful Improvement in Cylinder Construction, of which the following is a specification.

This invention relates to improvements in cylinder construction, and more especially to the fastening of a head to the end of a cylinder. The advantages of the construction shown will appear as I proceed with my specification. In that form of device embodying the features of my invention shown in the accompanying drawings, Figure 1 is a vertical section view of a cylinder with two ends fastened thereon by means of my invention, and Figure 2 is a view taken as indicated by the line 2 of Figure 1.

As shown in the drawings, 10 indicates a cylinder, such as may be used in connection with pneumatic or hydraulic machinery of any kind. Adapted to operate within the cylinder in the ordinary manner is a piston 11 mounted on the end of a piston rod 12.

As shown in the drawings, the cylinder is provided with two heads 13. My invention covers the construction by which these heads are attached to the ends of the cylinder. This construction is as follows. Since the construction at each end of the cylinder is the same, I will describe in detail that at only one end. The cylinder 10 has welded or riveted to it near its end a strap or stop ring 16 extending entirely around its circumference. A ring 17 is designed to fit over the end of the cylinder and pass over the stop ring 16. The ring 17 is provided at its bottom with a flattened part 18 so that it may serve as a standard or support for the cylinder. It is obvious that, without detracting from the spirit of this invention, the flattened part 18 on the ring 17 may be omitted if it is not desired to use said ring as a standard or support for the cylinder. The hole in the ring 17 through which the cylinder extends is provided about its center with a shoulder or offset 20. The diameter of the smaller hole as indicated by 21 is just large enough to pass over the stop ring 16. The ring 17 and head 13 are provided with corresponding holes adapted to receive the bolts 25. The head 13 is provided with a circular groove 26 adapted to receive the end of the cylinder 10. Placed within the groove 26 is a suitable packing against which the end of the cylinder 10 is adapted to be drawn in order to make a tight joint.

In mounting the head 13 the ring 17 is first slipped over the end of the cylinder and pushed up toward the middle of the cylinder. A ring or bar 30 of metal or any suitable material is then wound around the cylinder just behind the stop ring 16. The diameter of the larger part of the hole in the ring 17 as indicated by 31 is of sufficient size to pass over the ring or bar 30. The smaller part of the hole as indicated by 21, however, will not pass the bar 30. When the bar 30 is thus in place the ring 17 is slipped back toward the end of the cylinder to the position as shown in Figure 1 so that the ring or bar 30 will be clamped between the shoulder 20 and the stop ring 16. The groove 26 in the head 13 is then filled with suitable packing, the head is placed in position as shown in Figure 1, and the bolts 25 are put in place and tightened in order to draw the head 13 tightly up against the end of the cylinder. The ring or bar 30 prevents the ring 17 from being drawn off of the end of the cylinder.

With the construction as described above there is no difficulty in refitting the original stands to the cylinder or replacing stands at any time and maintaining the proper bolt centers for foundation bolts; as a considerable variation in the distance between the stands at the two ends of the cylinders is permitted by changing the position of the strap 16 or by providing bars 30 of different widths. The construction shown is also an improvement over the old method of fastening both heads to a cylinder by bolts extending the length of the cylinder and joining the heads; since, in the new construction, expansion or contraction of the cylinder longitudinally has no effect on the tightness of the joints and cannot injure the cylinder. The new construction is also an advantage over the old method of threading the heads on the ends of the cylinder; since by dispensing with the threads, the full cross-sectional area at the ends of the cylinder is retained, thus permitting a better joint against the packing 27. Dispensing with the threads at the ends of the cylinder also contributes greatly to the strength, since the cutting of threads, and especially threads in cylinders of large diameter, weakens the ends and makes the same more susceptible to breaking.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. In a cylinder construction, a cylinder with a head adapted to be fitted against the end thereof, a ring adapted to be slipped over the end of the cylinder, means for retaining the ring on the cylinder and means for drawing the ring and head together to hold the head tightly against the end of the cylinder.

2. In a cylinder construction, a cylinder with a head adapted to be fitted against the end thereof, a stop ring fastened to the outside of the cylinder near one end thereof, a ring adapted to be slipped over the cylinder and the stop ring, means for retaining said ring on the cylinder and means for drawing the ring and head together to hold the head tightly against the end of the cylinder.

3. In a cylinder construction, a cylinder with a head adapted to be fitted against the end thereof, a stop ring fastened to the outside of the cylinder near one end thereof, a ring adapted to be slipped over the cylinder and the stop ring, means cooperating with said stop ring for retaining said ring on the cylinder and means for drawing the ring and head together to hold the head tightly against the end of the cylinder.

4. In a cylinder construction, a cylinder with a head adapted to be fitted against the end thereof, a stop ring fastened to the outside of the cylinder near one end thereof, a ring having a hole with a shoulder adapted to be slipped over the cylinder and the stop-ring, means cooperating between the stop ring and the shoulder in the other ring for retaining said last-mentioned ring on the cylinder and means for drawing the ring and head together to hold the head tightly against the end of the cylinder.

5. In a cylinder construction, a cylinder with a head adapted to be fitted against the end thereof, a stop fastened to the outside of the cylinder near one end thereof, a ring adapted to be slipped over the cylinder and the stop, means for retaining said ring on the cylinder and means for drawing the ring and head together to hold the head tightly against the end of the cylinder.

6. In a cylinder construction, a cylinder with a head adapted to be fitted against the end thereof, a stop fastened to the outside of the cylinder near one end thereof, a ring adapted to be slipped over the cylinder and the stop, means cooperating with said stop for retaining said ring on the cylinder and means for drawing the ring and head together to hold the head tightly against the end of the cylinder.

7. In a cylinder construction, a cylinder with a head adapted to be fitted against the end thereof, a stop fastened to the outside of the cylinder near one end thereof, a ring having a hole with a shoulder adapted to be slipped over the cylinder and the stop, means cooperating between the stop and the shoulder in the other ring for retaining said ring on the cylinder and means for drawing the ring and head together to hold the head tightly against the end of the cylinder.

In witness whereof I have hereunto set my hand and seal this 6th day of April 1921.

GEORGE N. SIMPSON. [L. S.]